United States Patent
Kang et al.

(10) Patent No.: US 11,939,003 B2
(45) Date of Patent: Mar. 26, 2024

(54) REAR VEHICLE BODY STRUCTURE

(71) Applicants: Hyundai Motor Company, Seoul (KR); Kia Corporation, Seoul (KR)

(72) Inventors: ChangHak Kang, Hwaseong-si (KR); Chan Woong Jeon, Incheon (KR); Chulhee Heo, Hwaseong-si (KR); HaeHoon Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1 day.

(21) Appl. No.: 17/880,760

(22) Filed: Aug. 4, 2022

(65) Prior Publication Data

US 2023/0202579 A1 Jun. 29, 2023

(30) Foreign Application Priority Data

Dec. 27, 2021 (KR) .......................... 10-2021-0188454

(51) Int. Cl.
*B62D 25/20* (2006.01)
*B60N 2/015* (2006.01)

(52) U.S. Cl.
CPC ......... *B62D 25/2027* (2013.01); *B60N 2/015* (2013.01)

(58) Field of Classification Search
CPC .. B62D 25/2027; B60N 2/015; B60N 25/087; B60R 5/04
See application file for complete search history.

(56) References Cited

U.S. PATENT DOCUMENTS

| | | | | |
|---|---|---|---|---|
| 6,595,581 B2* | 7/2003 | Wolkersdorfer | ....... | B62D 21/10 296/204 |
| 8,336,658 B2* | 12/2012 | Rawlinson | ............... | B60K 1/04 429/96 |
| 8,926,006 B2* | 1/2015 | Mildner | ................. | B62D 21/14 296/193.07 |
| 10,723,391 B2* | 7/2020 | Saeki | ................. | B62D 25/2036 |
| 10,894,564 B2* | 1/2021 | Saeki | ................. | B62D 25/2027 |
| 11,091,016 B2* | 8/2021 | Matsuda | .................. | B60K 1/04 |
| 11,091,205 B2* | 8/2021 | Tsukamoto | ............ | B62D 25/08 |
| 11,148,718 B2* | 10/2021 | Mathieson | ............. | B62D 25/20 |
| 11,173,965 B2* | 11/2021 | Tsukamoto | ............ | B62D 25/20 |
| 11,192,586 B2* | 12/2021 | Kubota | .................... | B60K 1/04 |
| 11,420,509 B2* | 8/2022 | Saeki | ..................... | B60N 2/015 |
| 11,433,949 B2* | 9/2022 | Okamura | ............ | B62D 25/2036 |
| 11,661,116 B2* | 5/2023 | Ryu | .................... | B62D 25/2027 296/204 |
| 2020/0130544 A1* | 4/2020 | Schmidt | .................... | B60N 2/20 |
| 2021/0362786 A1* | 11/2021 | Kim | ........................ | B60L 50/66 |
| 2022/0266923 A1* | 8/2022 | Pyun | ................... | B62D 25/2018 |
| 2023/0202576 A1* | 6/2023 | Kang | ................ | B62D 25/2045 296/193.02 |
| 2023/0202578 A1* | 6/2023 | Maruyama | ............. | B62D 25/20 296/193.07 |
| 2023/0202582 A1* | 6/2023 | Inagaki | ................ | B62D 25/025 296/193.07 |

(Continued)

*Primary Examiner* — Jason S Morrow
(74) *Attorney, Agent, or Firm* — Slater Matsil, LLP

(57) ABSTRACT

A rear vehicle body structure of a vehicle including an underbody and an upper body coupled to the underbody is provided. The rear vehicle body structure includes a rear floor panel provided in a rear part of the upper body and coupled to the rear part of the underbody, the rear floor panel including forming parts extending in a vertical direction from both sides of the vehicle, respectively.

20 Claims, 8 Drawing Sheets

(56) References Cited

U.S. PATENT DOCUMENTS

| | | | |
|---|---|---|---|
| 2023/0211831 A1* | 7/2023 | Jeon | B62D 25/081 296/70 |
| 2023/0264561 A1* | 8/2023 | Kamemoto | B60K 1/04 180/312 |

* cited by examiner

REAR VEHICLE BODY STRUCTURE

CROSS-REFERENCE TO RELATED APPLICATIONS

This application claims the benefit of Korean Patent Application No. 10-2021-0188454, filed on Dec. 27, 2021, which application is hereby incorporated herein by reference.

TECHNICAL FIELD

An embodiment of the present invention relates to a vehicle body.

BACKGROUND

Recently, the vehicle industry has introduced a new concept of future mobility visions for realizing a human-centered dynamic future city. One of these future mobility solutions is a PBV (purpose-built vehicle) as a purpose-based mobility unit.

The PBV is an environment-friendly vehicle that provides a customized service for passengers during a period in which they travel to their destination and is typically electric vehicle-based.

The vehicle body of the PBV is manufactured in a box shape having a wide interior space. A vehicle body of the PBV includes an underbody (which is frequently called a rolling chassis or a skateboard) and an upper body mounted on the underbody.

On the other hand, the PBVs generally adopt a rear wheel CTBA (coupled torsion beam axle)/front wheel driving method.

Such a PBV is mounted with a battery module and a drive motor on the front of the vehicle body and with a rear seat on the rear of the vehicle body. In order to mount this rear seat to the rear of the vehicle body, the rear vehicle body structure of the PBV disposes the rear floor panel to be inclined upward.

Therefore, according to a conventional art, the PBV of the rear wheel CTBA front wheel drive type does not efficiently utilize the rear interior space.

The above information disclosed in this background section is only for enhancement of understanding of the background of the invention, and therefore it may contain information that does not form the prior art that is already known to a person of ordinary skill in the art.

SUMMARY

An embodiment of the present invention relates to a vehicle body. Particular embodiments relate to a rear vehicle body structure of a purpose-built vehicle (PBV).

An embodiment of the present invention provides a rear vehicle body structure in which the interior space of the rear side of the vehicle body on which the rear seat is mounted may be efficiently utilized.

A rear vehicle body structure according to an embodiment of the present invention including an underbody and an upper body coupled to the underbody includes a rear floor panel provided in the rear part of the upper body and coupled to the rear part of the underbody, wherein the rear floor panel includes forming parts respectively extending in the vertical direction from both sides along the vehicle width direction.

Also, in the rear vehicle body structure according to an embodiment of the present invention, the rear floor panel may include a panel bottom part formed flat with a predetermined height difference from the upper surface of each forming part.

The rear vehicle body structure according to an embodiment of the present invention may include a rear seat mount unit installed on the rear floor panel and a center floor panel provided on the center part of the upper body and connected to the rear floor panel.

In the rear vehicle body structure according to an embodiment of the present invention, the rear seat mount unit may include a rear crossmember disposed along the vehicle width direction and coupled to the upper part of each forming part, a front crossmember coupled to the center floor panel with a predetermined height difference from the rear crossmember and disposed along the vehicle width direction, and a plurality of seat mounting brackets coupled to the upper surface of the front crossmember to extend to a height corresponding to the height difference and disposed to be spaced apart along the vehicle width direction.

In the rear vehicle body structure according to an embodiment of the present invention, the rear crossmember may include a first bonding flange part respectively formed on both end parts and coupled to the upper surface and the inner surface of each forming part.

In the rear vehicle body structure according to an embodiment of the present invention, the front crossmember may include second bonding flange parts respectively formed on the front edge and the rear edge along the front and rear directions of the vehicle body and coupled to the upper surface of the center floor panel.

In the rear vehicle body structure according to an embodiment of the present invention, the front crossmember may be formed with a closed cross-section coupled to the upper surface of the center floor panel through the second bonding flange part.

In the rear vehicle body structure according to an embodiment of the present invention, each of a plurality of seat mounting brackets may be provided with a cup shape with a rectangular cross-section of which the upper end is closed and the lower end is opened.

In the rear vehicle body structure according to an embodiment of the present invention, each of a plurality of seat mounting brackets may include a third bonding flange part formed on the lower end and coupled to the upper surface of the front crossmember.

In the rear vehicle body structure according to an embodiment of the present invention, the rear floor panel may include a panel bottom part formed flat between each forming part, and an accommodating space formed between a plurality of seat mounting brackets and the lower part of the rear seat mounted on the rear crossmember.

In the rear vehicle body structure according to an embodiment of the present invention, at least one accommodating article may be accommodated in the accommodating space.

Embodiments of the present invention may efficiently utilize the indoor space of the PBV by forming the accommodating space in the rear part of the upper body, thereby further maximizing the merchantability of the PBV that provides various customized services to users.

In addition, effects obtained or predicted by the exemplary embodiments of the present invention are disclosed directly or implicitly in a detailed description of the exemplary embodiments of the present invention. That is, various effects predicted according to exemplary embodiments of the present invention will be disclosed in a detailed description to be described later.

BRIEF DESCRIPTION OF THE DRAWINGS

The drawings are provided for reference in describing exemplary embodiments of the present invention and the spirit of the present invention should not be construed only by the accompanying drawings.

Figure 1:
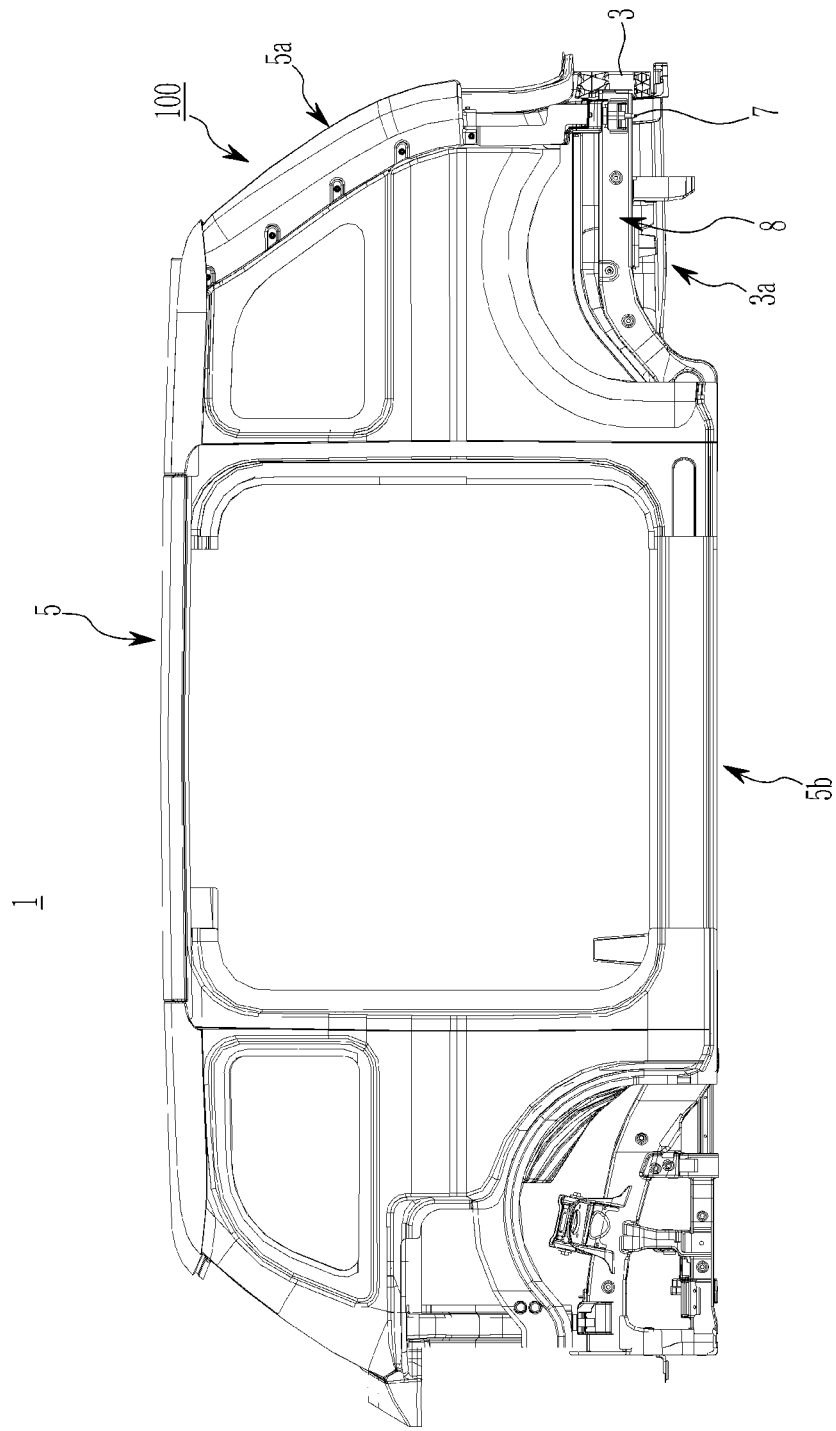
FIG. 1 is a view showing an example of a vehicle body of a PBV to which a rear vehicle body structure according to an embodiment of the present invention is applied.

The following reference identifiers may be used in connection with the accompanying drawings to describe exemplary embodiments of the present disclosure.

| | |
|---|---|
| 1: vehicle body | 3: underbody |
| 3a: underbody rear part | 5: upper body |
| 5a: rear part of upper body | 5b: center part of upper body |
| 7: mounting bolt | 8: rear side member |
| 9: rear seat | 10: rear floor panel |
| 11: forming part | 13: panel bottom part |
| 15: inner surface | 17: upper surface |
| 20: center floor panel | 30: seat mount unit |
| 31: rear crossmember | 33: front crossmember |
| 35: seat mounting bracket | 37: first bonding flange part |
| 39: second bonding flange part | 41: cross-section |
| 43: third bonding flange part | 51: accommodating space |
| 53: accommodating article | 100: rear vehicle body structure |

It should be understood that the above-referenced drawings are not necessarily to scale, presenting a somewhat simplified representation of various preferred features illustrative of the basic principles of the disclosure. The specific design features of embodiments of the present disclosure, including, for example, specific dimensions, orientations, locations, and shapes, will be determined in part by the particular intended application and use environment.

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present disclosure. As used herein, singular forms are intended to include plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly connected through one or more intermediary components, for example, by welding, self-piercing rivets (SPR), flow drill screws (FDS), structural adhesives, and the like.

It is understood that the term "vehicle," "vehicular," "car," or other similar term as used herein is inclusive of motor vehicles in general, such as passenger automobiles including sport utility vehicles (SUVs), buses, trucks, various commercial vehicles, watercraft including a variety of boats and ships, aircraft, and the like, and includes hybrid vehicles, electric vehicles, hybrid electric vehicles, hydrogen-powered vehicles, and other alternative fuel vehicles (e.g., fuels derived from resources other than petroleum).

Hereinafter, exemplary embodiments of the present invention will be described in detail with reference to the accompanying drawings.

FIG. 1 is a view showing an example of a vehicle body of a PBV to which a rear vehicle body structure according to an embodiment of the present invention is applied.

Referring to FIG. 1, the rear vehicle body structure 100 according to an embodiment of the present invention may be applied to a vehicle body 1 of a purpose-built vehicle (hereinafter referred to as a 'PBV') in one example.

The PBV may be defined as an environment-friendly vehicle that is electric vehicle-based and provides a customized service for passengers while traveling to a destination. In one example, the PBV may be a box-type design vehicle (e.g., a robo-taxi vehicle or a hailing vehicle) having a large interior space to move to the destination of the passenger in an unmanned autonomous driving manner.

The vehicle body 1 of such a PBV includes a skateboard-type underbody 3 (those skilled in the art usually refer to it as 'a rolling chassis') and an upper body 5 assembled to the underbody 3.

The underbody 3 may be provided as a chassis frame on which a battery assembly (not shown) may be mounted. In addition, the upper body 5 is a body in white (BIW) body coupled to the underbody 3 and may form a cabin.

In the present specification, for example, a reference direction for describing constituent elements may be set to be a vehicle body front and rear direction (e.g., a vehicle body length direction), a vehicle width direction, and a perpendicular direction.

"Upper end portion", "upper portion", "upper end", or "upper portion surface" of a component indicates an end portion, an upper portion, an upper end, or a surface of the component that is positioned relatively higher in the drawing, and "lower end portion", "lower portion", "lower end", or "lower portion surface" of a component indicates a lower end portion, a lower portion, a lower end, or a surface of the component that is positioned relatively lower in the drawing.

"End" (for example, one end, another end, or the like) of a component indicates an end of the component in any direction, and "end portion" (for example, one end portion, another end portion, or the like) of a component indicates a certain part of the component including the end.

On the other hand, the rear vehicle body structure 100 according to an embodiment of the present invention may be configured in the vehicle body 1 of the PBV to which a rear wheel CTBA (coupled torsion beam axle)/front wheel driving method is applied.

In the vehicle body 1 of the PBV, a battery module and a drive motor (not shown) may be mounted on the front part (not shown) of the underbody 3. In addition, in the interior space of the vehicle body 1 to the upper body 5, front and rear seats in two columns may be mounted.

The rear vehicle body structure 100 according to an embodiment of the present invention includes a structure that may efficiently utilize the interior space of the rear side of the upper body 5 on which the rear seat is mounted.

Figure 2:
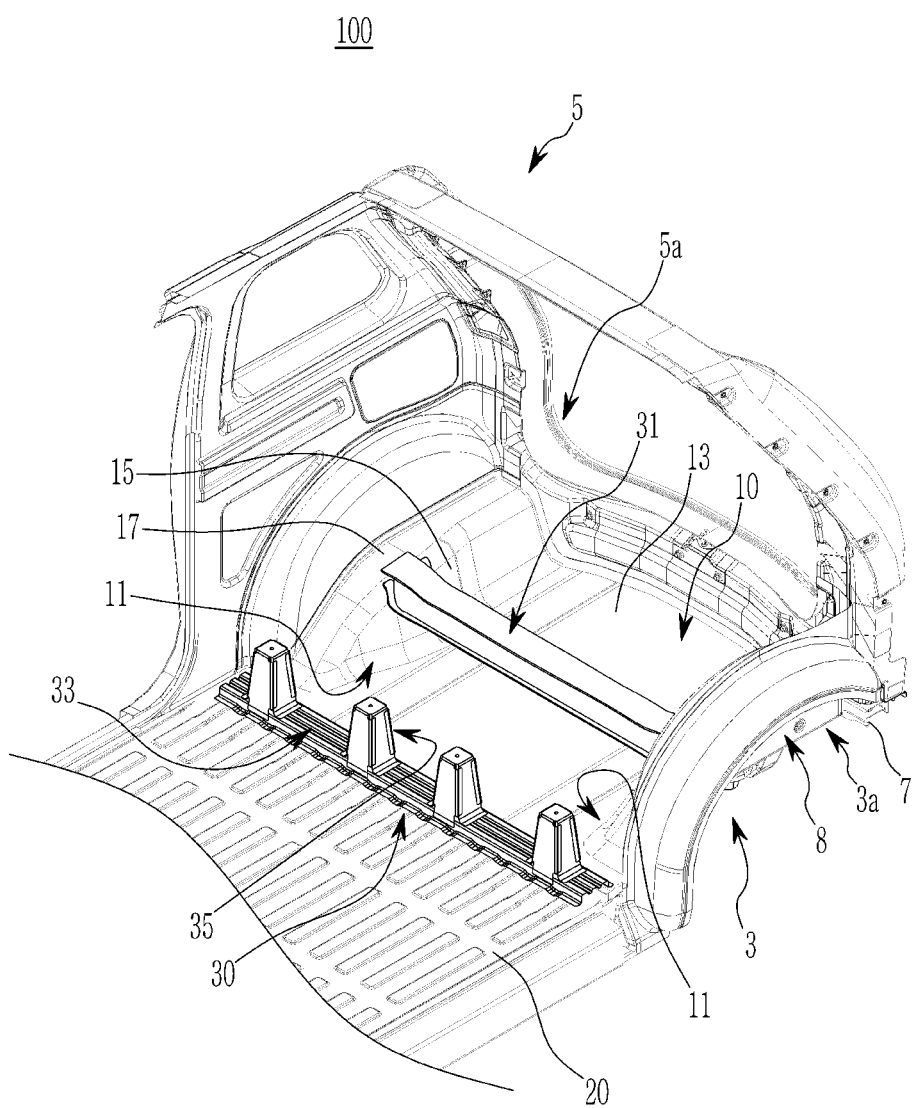
FIG. 2 and FIG. 3 are perspective views showing a rear vehicle body structure according to an embodiment of the present invention.
Figure 3:
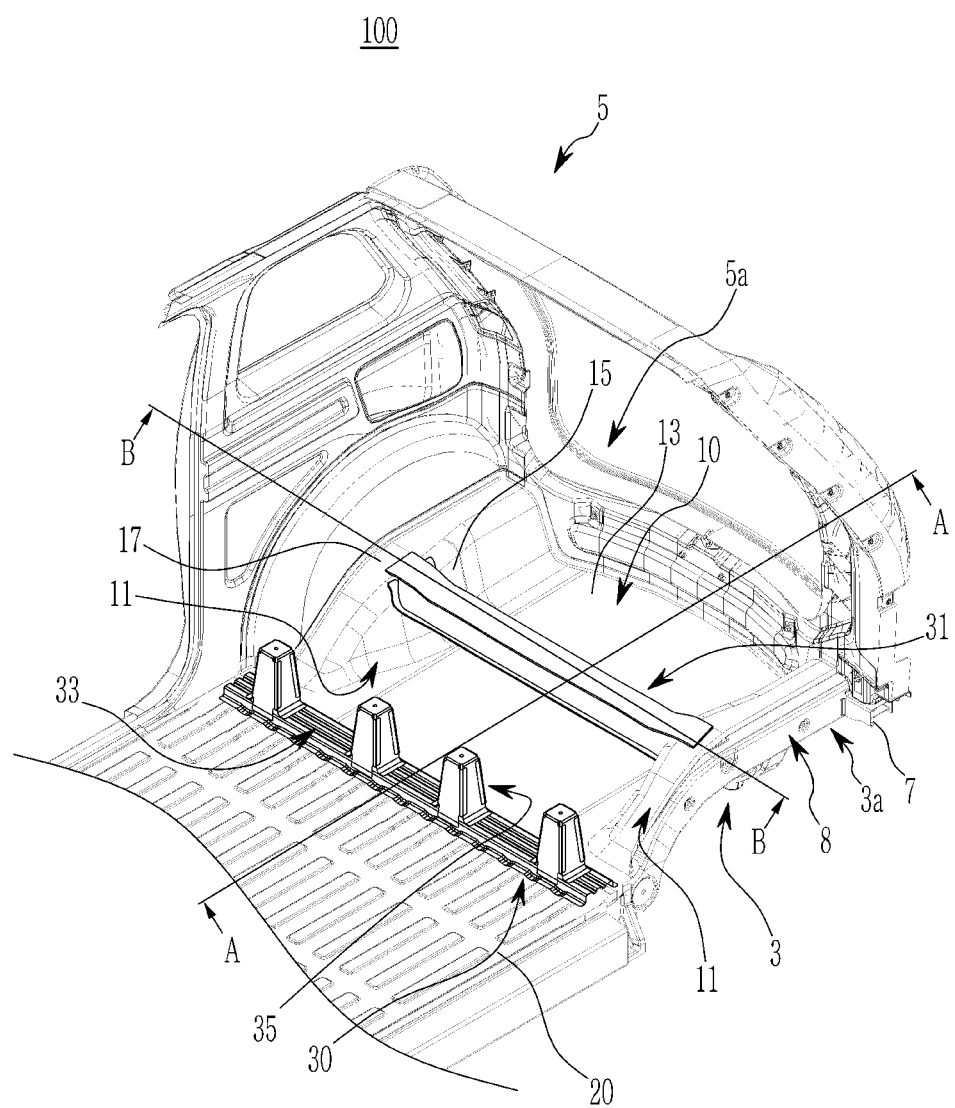
Figure 4:
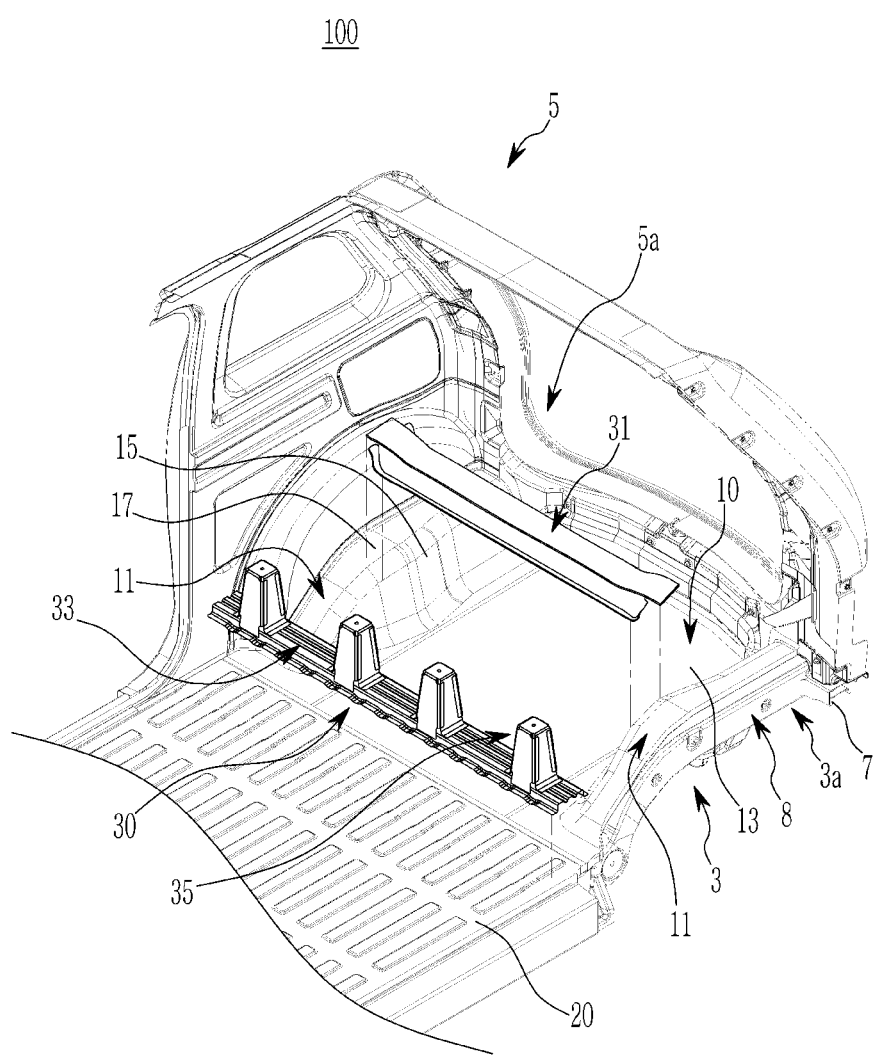
FIG. 4 is a partially exploded perspective view showing a rear vehicle body structure according to an embodiment of the present invention.
Figure 5:
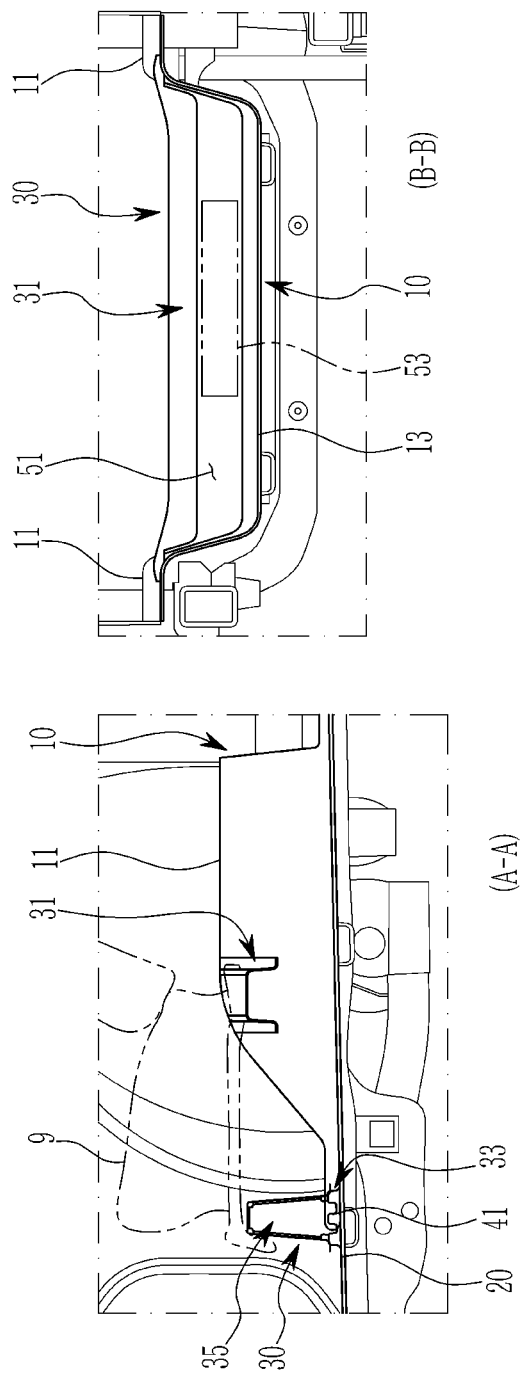
FIG. 5 is a cross-sectional view showing a rear vehicle body structure according to an embodiment of the present invention.

FIG. 2 and FIG. 3 are perspective views showing a rear vehicle body structure according to an embodiment of the present invention, FIG. 4 is a partially exploded perspective view showing a rear vehicle body structure according to an embodiment of the present invention, and FIG. 5 is a cross-sectional view showing a rear vehicle body structure according to an embodiment of the present invention.

Referring to FIG. 1 to FIG. 5, the rear vehicle body structure 100 according to an embodiment of the present invention may basically include a rear floor panel 10 and a rear seat mount unit 30.

In an embodiment of the present invention, the rear floor panel 10 is provided in a rear part 5a of the upper body 5. The rear floor panel 10 may be attached (e.g. mounted) to a rear part 3a of the underbody 3.

Here, the rear part 3a of the underbody 3 and the rear part 5a of the upper body 5 may be coupled (e.g., mounted) through a plurality of mounting bolts 7, which is well known to those skilled in the art.

The rear floor panel 10 according to an embodiment of the present invention includes forming parts 11 and a panel bottom part 13.

The forming parts 11 are formed to extend in the vertical direction on both sides along the vehicle width direction. Each of the forming parts 11 may be formed along the shape of the rear side member 8 disposed on the rear part 3a of the underbody 3.

Each of the forming parts 11 includes an inner surface 15 along the vehicle width direction and an upper surface 17 formed on the upper part of the inner surface 15.

The panel bottom part 13 is formed flat on the lower part of the rear floor panel 10 with a predetermined height difference from the upper surface 17 of each forming part 11.

Furthermore, the rear floor panel 10 as described above is connected to the center floor panel 20 provided in the center part 5b of the upper body 5. Here, the rear end part of the center floor panel 20 may be coupled to the front end part of the rear floor panel 10.

In an embodiment of the present invention, the rear seat mount unit 30 is configured to mount the rear seat 9 to the rear part 5a of the upper body 5. The rear seat mount unit 30 is installed on the rear floor panel 10 and the center floor panel 20 in the rear part 5a of the upper body 5.

This rear seat mount unit 30 includes a rear crossmember 31, a front crossmember 33, and a plurality of seat mounting brackets 35.

The rear crossmember 31 is designed to mount the rear part of a rear seat 9 to the rear floor panel 10. The rear crossmember 31 is disposed along the vehicle width direction and is coupled to the upper part of each forming part 11 in the rear floor panel 10.

Figure 6:
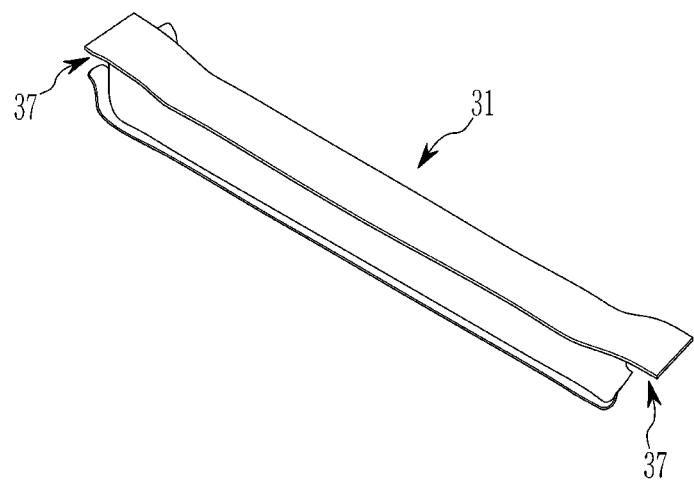
FIG. 6 is a view showing a rear crossmember of a seat mount unit applied to a rear vehicle body structure according to an embodiment of the present invention.

In one example, the rear crossmember 31, as shown in FIG. 6, may be provided with a shape in which both ends according to the vehicle width direction are opened, the upper surface along the vertical direction is closed, and the lower surface is opened.

Furthermore, the rear crossmember 31 includes a first bonding flange part 37 formed on both end parts, respectively. The first bonding flange part 37 may be coupled to the upper surface 17 and the inner surface 15 of each forming part 11.

The front crossmember 33 is designed to mount the front part of the rear seat 9 to the rear end part of the center floor panel 20. The front crossmember 33 is coupled to the rear end part of the center floor panel 20 with a predetermined height difference from the rear crossmember 31 and is disposed along the vehicle width direction. That is, the front crossmember 33 is disposed below the rear crossmember 31.

Figure 7:
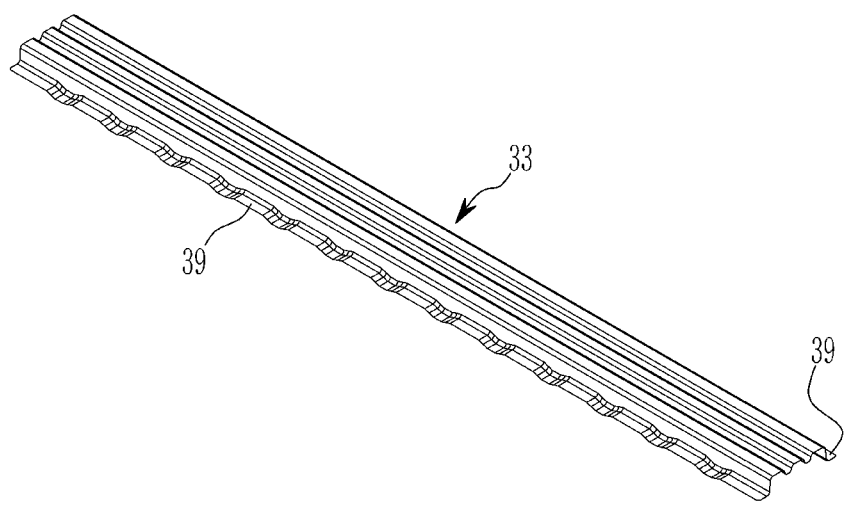
FIG. 7 is a view showing a front crossmember of a seat mount unit applied to a rear vehicle body structure according to an embodiment of the present invention.

In one example, the front crossmember 33, as shown in FIG. 7, may be provided with a shape in which both ends according to the vehicle width direction are opened, the upper surface according to the vertical direction is closed, and the lower surface is opened.

Furthermore, the front crossmember 33 includes second bonding flange parts 39 respectively formed on the front edge portion and the rear edge portion along the front and rear directions of the vehicle body. The second bonding flange parts 39 may be coupled to the upper surface of the rear end part of the center floor panel 20.

Here, as the front crossmember 33 is coupled to the upper surface of the rear end part of the center floor panel 20 through the second bonding flange part 39, it may be formed with a closed cross-section 41 by the upper surface of the rear end part.

Also, a plurality of seat mounting brackets 35 are adapted to compensate for the height difference between the rear crossmember 31 and the front crossmember 33. That is, a plurality of seat mounting brackets 35 are adapted to keep the front part and the rear part of the rear seat 9 horizontal. Those skilled in the art also refer to a plurality of seat mounting brackets 35 as 'tower brackets'.

Each of the plurality of seat mounting brackets 35 is coupled to the upper surface of the front crossmember 33 and extends from the upper surface to a height corresponding to the height difference between the rear crossmember 31 and the front crossmember 33. Each of a plurality of seat mounting brackets 35 is disposed spaced apart along the vehicle width direction.

Figure 8:
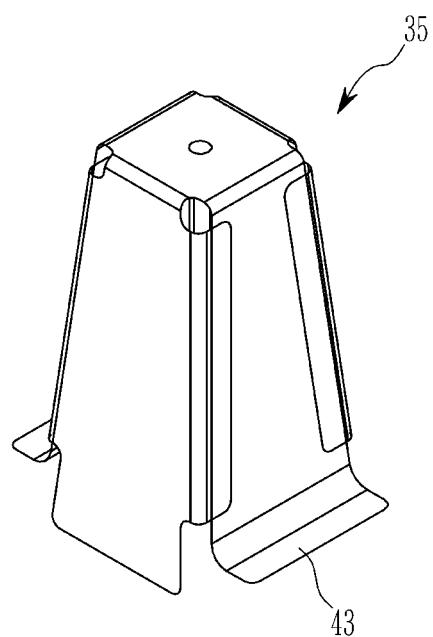
FIG. 8 is a view showing a seat mounting bracket of a seat mount unit applied to a rear vehicle body structure according to an embodiment of the present invention.

Each of the plurality of seat mounting brackets 35, as shown in FIG. 8, in one example, may be provided in a cup shape of a hollow square cross-section in which the upper end is closed and the lower end is opened.

Furthermore, each of the plurality of seat mounting brackets 35 includes a third bonding flange part 43 formed on the lower end. The third bonding flange part 43 may be coupled to the upper surface of the front crossmember 33.

The rear vehicle body structure 100 according to an embodiment of the present invention configured as described above includes the rear floor panel 10 in which the forming parts 11 and the panel bottom part 13 are formed and the seat mount unit 30 mounted with the height difference from the forming parts 11 and the center floor panel 20.

Accordingly, the rear vehicle body structure 100 according to an embodiment of the present invention may form the accommodating space 51 between the lower part of the rear seat 9 mounted on the seat mount unit 30 and the panel bottom part 13 of the rear floor panel 10.

At least one accommodating article 53 input from the rear side of the PBV may be accommodated in this accommodating space 51. For example, at least one accommodating article 53 may include various vehicle accommodating articles such as a drawer-type accommodating box, a speaker, a spare tire, a fire extinguisher, an autonomous driving controller, and an auxiliary battery.

According to the rear vehicle body structure 100 according to an embodiment of the present invention as described so far, as the accommodating space 51 is formed in the rear part 5a of the upper body 5, the indoor space of the PBV may be efficiently utilized.

Accordingly, the rear vehicle body structure 100 according to an embodiment of the present invention may accommodate various vehicle accommodating articles in the accommodating space 51, so that it is possible to further maximize the merchantability of the PBV that provides various customized services to users.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A rear vehicle body structure of a vehicle, the vehicle comprising an underbody and an upper body coupled to the underbody, the rear vehicle body structure comprising:
    a rear floor panel provided in a rear part of the upper body and coupled to the rear part of the underbody, the rear floor panel comprising forming parts extending in a vertical direction from both sides of the vehicle, respectively;
    a center floor panel provided on a center part of the upper body and connected to the rear floor panel;
    a rear seat mount unit mounted on the rear floor panel, the rear seat mount unit comprising:
        a rear crossmember disposed along a vehicle width direction and coupled to an upper part of the forming parts;
        a front crossmember disposed along the vehicle width direction and coupled to the center floor panel with a predetermined height difference from the rear crossmember; and
        a plurality of seat mounting brackets coupled to an upper surface of the front crossmember to extend to a height corresponding to the height difference and disposed to be spaced apart along the vehicle width direction, wherein the front crossmember comprises second bonding flange parts respectively formed on a front edge and a rear edge along a length direction of the vehicle and coupled to an upper surface of the center floor panel.

2. The rear vehicle body structure of claim 1, wherein the rear floor panel comprises a panel bottom part that is flat and has a predetermined height difference from an upper surface of the forming parts.

3. The rear vehicle body structure of claim 1, wherein the rear crossmember comprises first bonding flange parts respectively formed on both end parts and coupled to an upper surface and an inner surface of the forming parts.

4. The rear vehicle body structure of claim 1, wherein the front crossmember has a closed cross-section and is coupled to the upper surface of the center floor panel through the second bonding flange parts.

5. The rear vehicle body structure of claim 1, wherein each of the plurality of seat mounting brackets has a cup shape with a rectangular cross-section of which an upper end is closed and a lower end is opened.

6. The rear vehicle body structure of claim 5, wherein each of the plurality of seat mounting brackets comprises a third bonding flange part formed on the lower end and coupled to the upper surface of the front crossmember.

7. The rear vehicle body structure of claim 1, wherein the rear floor panel further comprises:
    a panel bottom part that is flat and is disposed between the forming parts; and
    an accommodating space defined between the plurality of seat mounting brackets and a lower part of a rear seat mounted on the rear crossmember.

8. The rear vehicle body structure of claim 7, wherein an accommodating article is accommodated in the accommodating space.

9. A vehicle body comprising:
    an underbody;
    an upper body coupled to the underbody;
    a rear floor panel provided in a rear part of the upper body and coupled to the rear part of the underbody, the rear floor panel comprising:
        forming parts extending in a vertical direction from both sides of the vehicle body, respectively; and
        a panel bottom part that is flat and has a predetermined height difference from an upper surface of the forming parts;
    a center floor panel provided on a center part of the upper body and connected to the rear floor panel; and
    a rear seat mount unit mounted on the rear floor panel, the rear seat mount unit comprising:
        a rear crossmember disposed along a vehicle width direction and coupled to an upper part of the forming parts;
        a front crossmember disposed along the vehicle width direction and coupled to the center floor panel with a predetermined height difference from the rear crossmember, wherein the front crossmember comprises second bonding flange parts respectively formed on a front edge and a rear edge along a length direction of the vehicle body and coupled to an upper surface of the center floor panel; and
        a plurality of seat mounting brackets coupled to an upper surface of the front crossmember to extend to a height corresponding to the height difference and disposed to be spaced apart along the vehicle width direction.

10. The vehicle body of claim 9, wherein the rear crossmember comprises first bonding flange parts respectively formed on both end parts and coupled to an upper surface and an inner surface of the forming parts.

11. The vehicle body of claim 9, wherein the front crossmember has a closed cross-section and is coupled to the upper surface of the center floor panel through the second bonding flange parts.

12. The vehicle body of claim 9, wherein each of the plurality of seat mounting brackets has a cup shape with a rectangular cross-section of which an upper end is closed and a lower end is opened.

13. The vehicle body of claim 12, wherein each of the plurality of seat mounting brackets comprises a third bonding flange part formed on the lower end and coupled to the upper surface of the front crossmember.

14. The vehicle body of claim 9, wherein the rear floor panel further comprises an accommodating space defined between the plurality of seat mounting brackets and a lower part of a rear seat mounted on the rear crossmember.

15. The vehicle body of claim 14, wherein an accommodating article is accommodated in the accommodating space.

16. A rear vehicle body structure of a vehicle, the vehicle comprising an underbody and an upper body coupled to the underbody, the rear vehicle body structure comprising:

a rear floor panel provided in a rear part of the upper body and coupled to the rear part of the underbody, the rear floor panel comprising forming parts extending in a vertical direction from both sides of the vehicle and a panel bottom part that is flat and is disposed between the forming parts;

a center floor panel provided on a center part of the upper body and connected to the rear floor panel; and a rear seat mount unit mounted on the rear floor panel, wherein the rear seat mount unit comprises:

a rear crossmember disposed along a vehicle width direction and coupled to an upper part of the forming parts;

a front crossmember disposed along the vehicle width direction and coupled to the center floor panel with a predetermined height difference from the rear crossmember; and a plurality of seat mounting brackets coupled to an upper surface of the front crossmember to extend to a height corresponding to the height difference and disposed to be spaced apart along the vehicle width direction, wherein the rear floor panel comprises an accommodating space defined between the plurality of seat mounting brackets and a lower part of a rear seat mounted on the rear crossmember.

17. The rear vehicle body structure of claim 16, wherein the panel bottom part has a predetermined height difference from an upper surface of the forming parts.

18. The rear vehicle body structure of claim 16, wherein the rear crossmember comprises first bonding flange parts respectively formed on both end parts and coupled to an upper surface and an inner surface of the forming parts.

19. The rear vehicle body structure of claim 16, wherein each of the plurality of seat mounting brackets has a cup shape with a rectangular cross-section of which an upper end is closed and a lower end is opened.

20. The rear vehicle body structure of claim 19, wherein each of the plurality of seat mounting brackets comprises a third bonding flange part formed on the lower end and coupled to the upper surface of the front crossmember.

* * * * *